Jan. 7, 1969   J. N. REDING, JR., ET AL   3,420,658

FLUID SLUDGE METHOD

Filed March 3, 1966

INVENTORS.
John N. Reding, Jr.
BY Norman H. Berhenke

Edward E. Schilling

ATTORNEY

United States Patent Office 3,420,658
Patented Jan. 7, 1969

3,420,658
FLUID SLUDGE METHOD
John N. Reding, Jr., Midland, and Norman H. Berhenke, Harrison, Mich., assignors to The Dow Chemical Company, Midland, Mich., a corporation of Delaware
Filed Mar. 3, 1966, Ser. No. 531,589
U.S. Cl. 75—67
Int. Cl. C22b 45/00
3 Claims The invention relates to a novel apparatus and method for separating fluid sludge from molten magnesium metal.

For the purposes of the specification and claims, the term magnesium metal is understood to include elemental magnesium as well as alloys comprising at least 25 percent by weight magnesium.

During the processing of molten magnesium alloys a sludge layer composed of both liquid and solid phases usually collects at the bottom of the pot. This sludge consists mainly of flux used to protect and refine the magnesium melt, as well as magnesium alloy droplets, metal oxides and carbon entrained in the flux during melting and alloying operations. In some instances the sludge also contains the saline residues resulting from the reduction of metal halides by the magnesium, wherein reduction and alloying are carried out concurrently in situ. After the sludge layer has settled out of the molten metal charge, most of the metal product is decanted or pumped from the pot. To avoid disturbing the sludge layer, it is common practice to leave a metal heel, i. e., a quantity of molten metal at least several inches deep overlying the sludge. Specially adapted power shovel or bucket equipment is then used to dredge up the solid portions of the sludge for discarding. During this operation an attempt usually is made to mechanically separate the molten metal which is picked up along with the mixture of both solid and liquid or fluid sludge.

The separation of molten metal and fluid sludge is especially difficult and a considerable amount of metal is lost with the discarded sludge. The separation of the molten phases is also compounded by the ease with which molten metal droplets, created during mechanical operations, become dispersed in the fluid sludge.

It is therefore a principal object of the invention to provide an improved method of separating fluid sludge from a mixture of molten magnesium metal and such sludge, and apparatus for carrying out the improved method.

Figure 1:
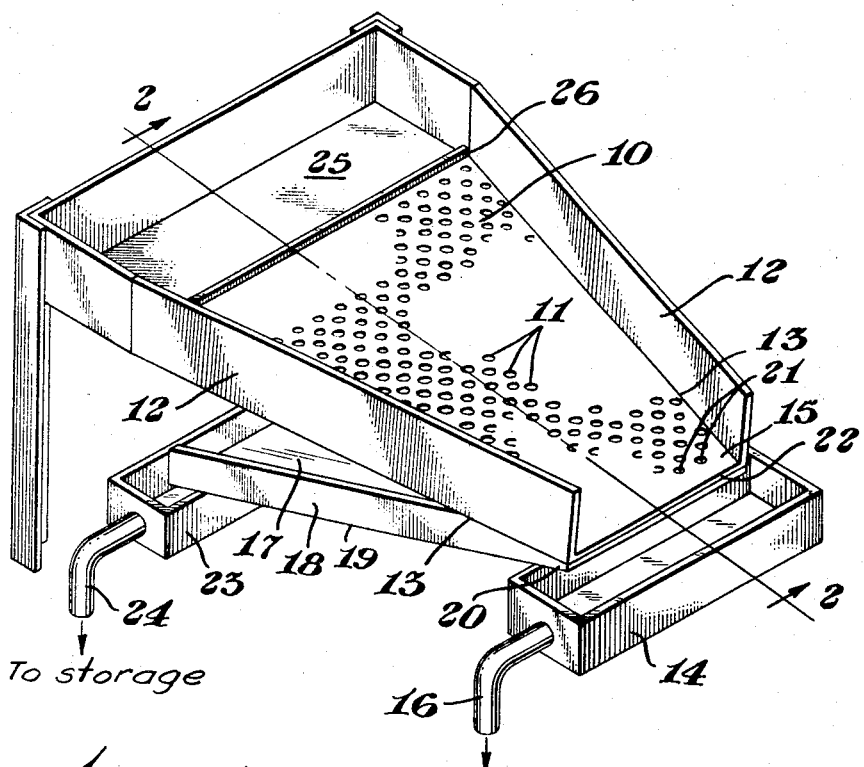
Figure 2:
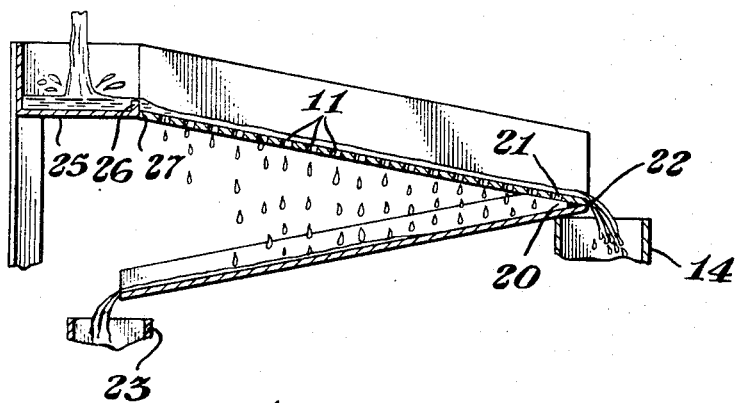

This and other objects and advantages of the present invention will become apparent to those skilled in the art upon becoming familiar with the following description and the appended drawings, in which FIG. 1 is a perspective view of the mechanical separator of the invention, and FIG. 2 is a fragmentary transverse view in section of the apparatus of FIG. 1, but modified from FIG. 1 to show liquid mixture being separated.

The invention is predicated on the discovery that upon flowing a mixture of fluid sludge and molten magnesium metal over an inclined foraminous oxide-coated ferrous metal plate, the fluid sludge wets the foramina and flows through and onto the oppositely inclined plate or collector, while the molten magnesium metal flows on down the plane of the foraminous ferrous metal plate and off the lower end thereof, thereby separating the fluid sludge and the molten metal. The fluid sludge and molten metal are separately collected.

Referring now to FIGURE 1, the apparatus is seen to comprise an inclined plate 10 having a great multiplicity of formina or perforations 11 formed therethrough. Upwardly turned flange portions 12 extending longitudinally along the lateral edges 13 of the inclined plate 10 serve as flow directing means to keep molten metal and/or sludge flowing down the plate. A vessel or trough 14 disposed beneath the lower end portion 15 of the plate 10 serves as collecting means for molten metal traversing the plate. The pipe 16 serves as means to transfer the separated molten metal to storage, or, more usually, back to the melting pot (not shown).

An oppositely inclined imperforate plate 17 with flanges 18 at the edges 19, or any equivalent trough-like structure, is disposed beneath the inclined plate 10 with the upper end 20 thereof sealingly attached to the lower end 15 of the foraminous plate 10 between the lowest positioned holes 21 and the edge 22, from which the metal drains, to to provide for separate collection of fluid sludge flowing through the foramina 11. Thus the fluid sludge is prevented from running down the underside of the inclined plate 10 to the edge 22 and into the trough 14 where the molten metal collects. Attachment of the imperforate plate 17 to the foraminous plate 10 is generally done by welding or riveting the plates together. Generally it is convenient to employ another vessel or trough 23 as a reservoir positioned to receive collected fluid sludge. Such collected fluid sludge is conveyed by suitable means, such as pipe 24, to any appropriate storage, such as steel drums, and sent to a waste disposal area.

It is to be preferred to also employ a reservoir or quiescent pool means 25 at the upper end of the inclined plate 10 with a reservoir-defining, upwardly extending flange 26 extending completely across the transverse upper edge 27 of the plate. The flange serves as a dam. Such a dam provides for smooth, even, non-turbulent flow of the sludge mixture onto the inclined plate 10 substantially from transverse edge to transverse edge of the plate, as illustrated more clearly in FIGURE 2 where flowing liquid mixture is represented.

The foramina in the plate may be of any suitable size which admits fluid sludge, but will not pass molten magnesium metal. Operable differential or discriminating flow characteristics are dependent on the depth, or head, of molten magnesium metal, the magnesium metal-flux interfacial tension and the predominant sizes of metal globules dispersed in the fluid sludge. The head of molten metal which will force molten metal through a given size hole is a function of the said interfacial tension. The greater the head, the more readily molten metal is forced through against the restraining tendency of the interfacial tension.

In the case of a metal globule, size is the determining factor unless the globule is substantially larger than the hole against which it is pressed. With larger holes, there is a greater flow of fluid sludge but there is a tendency for larger metal globules to pass through with the fluid sludge.

While the fluid sludge will flow through foramina down to a diameter of about 0.010 inch, molten magnesium tends also to flow through holes above about ¼ inch in diameter where the head of molten metal is one inch or greater. Generally hole diameters in the range of $\frac{1}{32}$ to ¼ inch are suitable at practical flow rates. A foraminous plate with holes about ⅛ inch in diameter is to be preferred for most operations, since such holes permit a rapid flow of fluid sludge and prevent a flow of molten magnesium through the plate while minimizing the loss of metal globules.

The foramina-containing inclined plate may be made of any material of construction which shows the necessary discriminatory behavior of being wetted substantially only by the fluid sludge. A very practical material, most ordinarily employed, is a ferrous based metal; preferably mild steel is used. The ferrous metal, even when nominally clean, still has an oxide or hydroxide surface coating thereon. It is this coating which is preferentially wetted by the fluid sludge. As indicated by prior filed application, Ser. No. 250,212, now Patent No. 3,300,298, a ferrous metal surface freed of such oxide of hydroxide coating is preferentially wetted by molten magnesium. A ferrous metal surface clad with cadmium, copper, nickel, tin or zinc and immersed in molten magnesium is wetted by the magnesium. Therefore ferrous metal clad with such metal coatings is not suited for use as the inclined plate in the apparatus and practice of the present invention.

The inclined plate should have strength characteristics such that it does not sag at temperatures in the range of 1,200 to 1,500° F. A thickness of 0.125 inch has been found suitable for a plate 6 inches wide at the top and narrowing to 4 inches at the lower edge, while a thickness of 0.25 inch has been found suitable for a plate 14 inches wide at the top and narrowing to about 12 inches at the lower edge.

The angle of inclination of the plate is not sharply critical. If the plate is inclined too little, there is less throughput and a greater tendency for some molten magnesium to escape through the foramina. If the plate is set at a steeper angle, the throughput goes up. At too steep an angle, all the fluid sludge does not drain away before traversing the inclined plate with the molten metal. Generally an angle of inclination of about 5 to 20 degrees from the horizontal is satisfactory; an angle of approximately 10 degrees is preferred.

The holes in the plate are preferably close placed in staggered array, e.g., ⅛ inch holes on 3/16 inch centers, so as to intercept substantially all of the flow of fluid sludge and not let any run down and off the lower edge of the plate with the molten metal.

In carrying out the method of the invention, fluid sludge mixture is transferred to the inclined plate 10, as by pouring the sludge mixture from a ladle, the stream falling near the upper edge of the inclined plate. If the sludge contains a solid phase, the solids are preferably first removed as by passing the sludge through a coarse screen or grid with ¼ to ½ inch openings, before using the present apparatus. Preferably, the fluid sludge mixture is not poured directly onto the inclined plate, but into a reservoir or pool 25 positioned and adapted to overflow non-turbulently onto the upper end 27 of the inclined plate and substantially from side to side of the inclined plate. To get full use of the foramina in the inclined plate, it is highly important that the plate is substantially level, from transverse edge to transverse edge. With the inclined plate in a level position, the fluid sludge mixture spreads all across the plate and does not run down just one side thereof.

Fluid sludge mixture is poured or conveyed onto the plate at a rate such that all the fluid sludge is afforded an opportunity to flow down through the holes or foramina before the sludge-molten metal mixture reaches the imperforate portion of the lower end of the inclined plate. The molten metal flowing off the lower edge of the inclined plate is collected in the trough 14 and conveyed to storage, or, more usually, back to the melting pot. Fluid sludge passing through the foraminous plate is directed into a trough and then conveyed to storage, as in steel drums, prior to disposal.

As an illustrative example of the present method using the apparatus of the invention, about 50 pounds of AZ31B alloy was prepared in a melting and alloying pot. After the sludge layer had settled, the molten metal was decanted in conventional fashion by pumping off about all that could be removed without too much probability of disturbing the underlying fluid sludge layer. There remained a layer of molten metal about 5 to 6 inches deep above the sludge. The contents of the pot were poured through a dam plate having ¼ inch openings therethrough to separate solid sludge from the rest of the contents of the pot. The stream flowing through the dam was directed onto a preheated foraminous steel plate ⅛ inch thick having an array of ⅛ inch holes formed therethrough on 3/16 inch centers. The plate was at a temperature of about 1,000° F.

The fluid sludge ran through the holes in the plate and was collected for disposal while the molten magnesium alloy ran down the upper side of the plate and off the end into a vessel positioned to receive all the molten metal. The collected fluid sludge was examined after cooling and found to be substantially free of metal. The collected molten metal was weighed and the total metal loss of the alloying operation was calculated to be 2.7 percent by weight. The collected molten metal was afterward examined and found to be substantially free of fluid sludge.

By way of comparison, another 50 pound charge of AZ31B alloy was prepared in the same pot and in the same manner, except that the inclined plate separator assembly of the invention was not used. Instead, the operator decanted the residual heel of molten metal directly into a vessel while trying to avoid transfer of fluid sludge. The recovered molten magnesium metal was weighed and the total melt loss in the alloying operation was computed to be 6.1 percent by weight.

The method and apparatus of the invention having been thus described, various modifications thereof will at once be apparent to those skilled in the art and the scope of the invention is to be deemed limited only by the scope of the claims hereafter appended.

We claim:
1. The method of separating fluid sludge from a mixture containing molten magnesium metal and fluid sludge which comprises:
   flowing said mixture over an inclined foraminous ferrous metal plate, said plate being substantially non-wetted by the molten magnesium metal.
2. The method as in claim 1 in which the molten magnesium metal is collected at the lower edge of the inclined foraminous steel plate and the fluid sludge is collected by collection means disposed beneath the foramina in the inclined foraminous plate, said fluid sludge being collected separately from said molten magnesium metal.
3. The method as in claim 1 in which the mixture is first flowed into a reservoir and then passed evenly and non-turbulently from said reservoir onto said inclined foraminous steel plate, said inclined foraminous steel plate being supported in a position such that the plate is substantially level from transverse edge to transverse edge.

References Cited
UNITED STATES PATENTS

| | | | |
|---|---|---|---|
| 98,583 | 1/1870 | Gluck | 209—243 |
| 887,557 | 5/1908 | Werckle | 209—397 X |
| 1,111,217 | 9/1914 | Cole | 209—254 X |
| 2,536,286 | 1/1951 | Hewett et al. | 209—49 X |
| 3,300,298 | 1/1967 | Reding | 75—67 |

OTHER REFERENCES
Cross Engineering Co. Catalog: Perforated Sheet Metals, Carbonadale, Pa., 1927, pp. 1, 3, 30.

L. DEWAYNE RUTLEDGE, *Primary Examiner.*

H. W. TARRING II, *Assistant Examiner.*

U.S. Cl. X.R.

209—202, 254, 265, 397; 266—37